Jan. 18, 1966  J. T. KUTNEY  3,229,933
CRUISE FAN POWERPLANT
Filed June 5, 1964  2 Sheets-Sheet 1
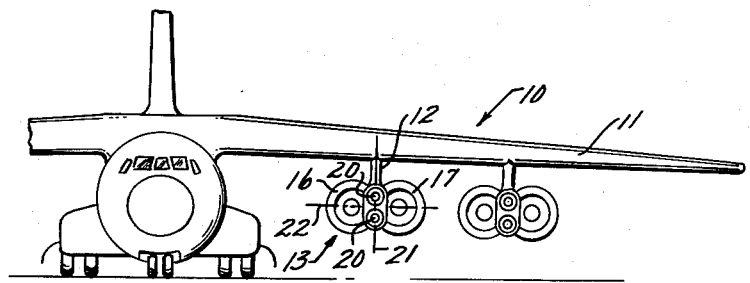
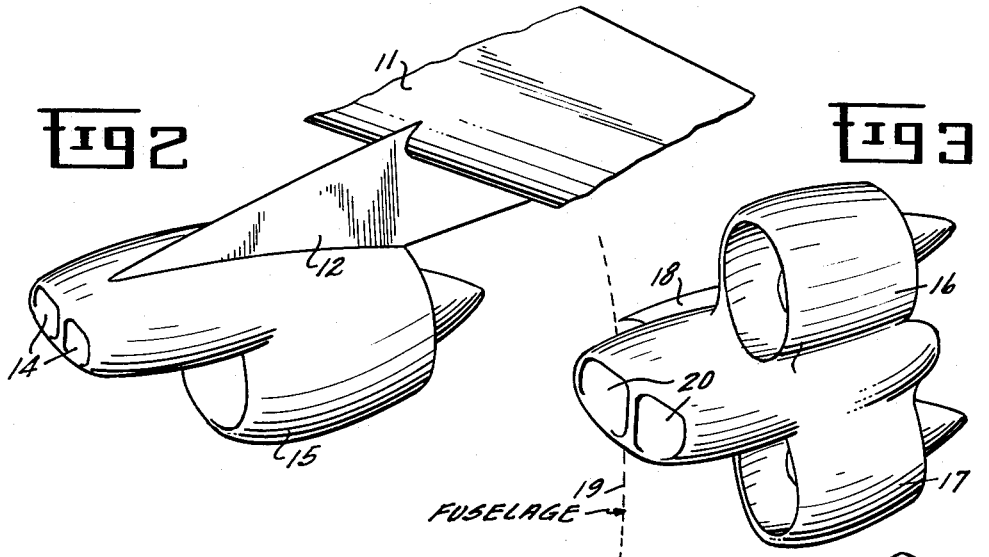
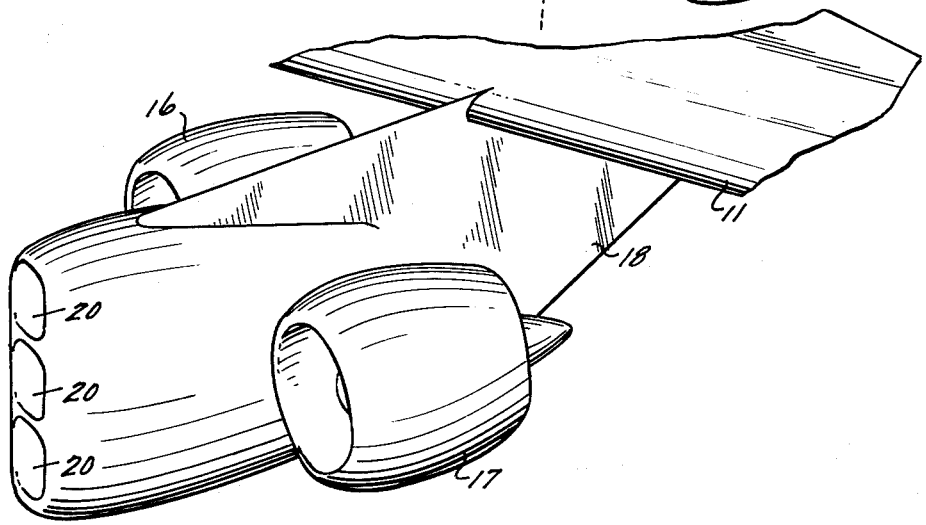
INVENTOR.
JOHN T. KUTNEY
BY
John F. Cullen
ATTORNEY

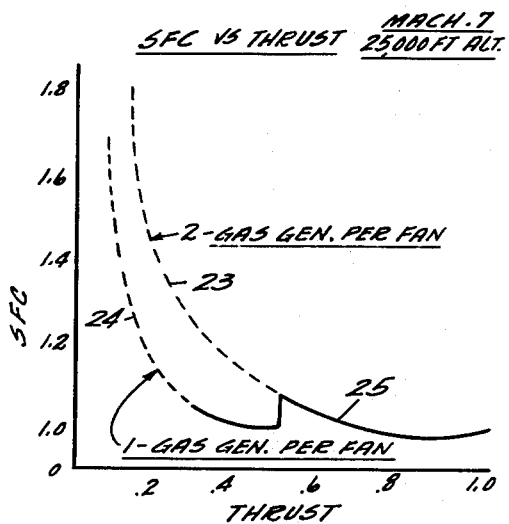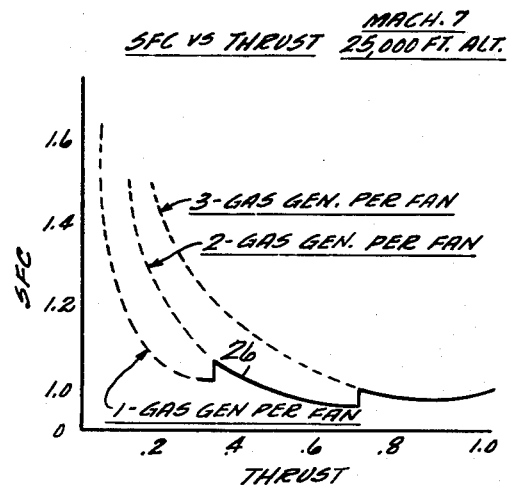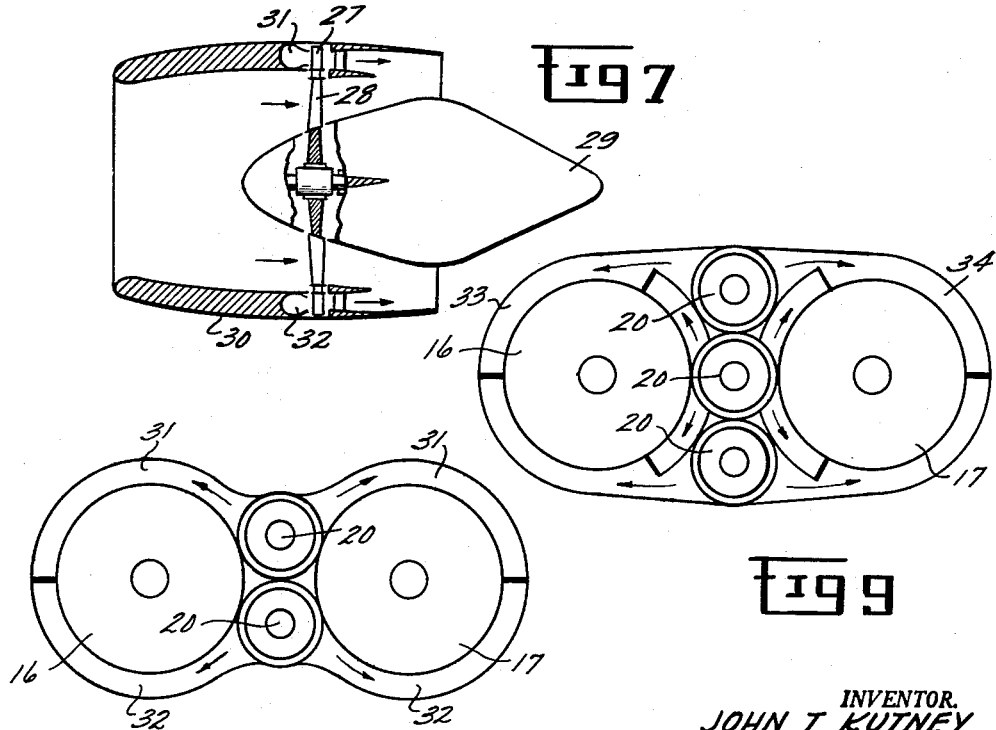

United States Patent Office 3,229,933
Patented Jan. 18, 1966

3,229,933
CRUISE FAN POWERPLANT
John T. Kutney, Cincinnati, Ohio, assignor to General Electric Company, a corporation of New York
Filed June 5, 1964, Ser. No. 372,781
13 Claims. (Cl. 244—55)

The present invention relates to a cruise fan powerplant and, more particularly, to a cruise fan powerplant employing two tip turbine cruise fans and specifically arranged plural gas generators feeding each of the fans and to the method of operation of the powerplant.

Interest in large airplanes that are adapted for long range and long endurance has created a need for powerplants that operate inexpensively or, at low specific fuel consumption for long periods of time and under different load and thrust conditions. Missions of this type have pretty much dictated high bypass ratio engines of which the cruise fan is typical. Such an engine takes in large amounts of flow through the fan relative to the gas generator flow resulting in high propulsive efficiency. Thus, propulsive efficiency is increased in a fan arrangement because the exhaust velocity of the fan is brought close to the velocity of the free stream so there is not much unused exhaust energy left in the exhaust stream. This arrangement thus uses the energy in the exhaust gases to bring more flow into the fan to improve the specific fuel consumption characteristics.

It is well known that a high bypass ratio turbofan is a desirable powerplant for subsonic speed because it is inexpensive to run and it is very efficient thermodynamically. One of the problems in the use of such a powerplant has been how to install it in such a way on an aircraft that the drag is not so high as to balance out the advantages obtainable thermodynamically from the high bypass ratio turbofan. A turboprop engine has characteristics similar to the turbofan up to certain speeds. However, above speeds of Mach 6 the turboprop loses efficiency due to compressibility effects and becomes impractical.

The high bypass ratio turbofan has a very good characteristic specific fuel consumption versus thrust curve. A typical curve for such an engine has a low point at the high thrust condition necessary for takeoff but this curve gradually rises to become very high at low thrust conditions which may be desired once the aircraft is in the air and part of its fuel has been used. The engines are not designed to operate efficiently at low power settings or low thrust output. The engines and aircraft are normally designed for one another so that operation will take place primarily at the low point of the curve or at low specific fuel consumption.

It will be apparent that long range aircraft will not operate on the favorable part of the curve. This occurs because the takeoff weight is extremely high with heavy loads of fuel and, at the end of the mission, the aircraft is relatively light and only a low thrust is required to maintain the speed of the aircraft. At this point it is desirable to throttle the engines back and operate them economically and easily for longer life but the specific fuel consumption (SFC) versus thrust curve simply does not fit this condition of operation.

The main object of the present invention is to provide a cruise fan powerplant arrangement which permits a variable bypass ratio effect with its resultant significant SFC versus net thrust gain at low power settings.

A further object is to provide such a powerplant arrangement wherein the line of thrust is always maintained upon any engine failure.

A further object is to provide a powerplant arrangement wherein on the loss of an engine the thrust obtained is more than normal.

Another object is to provide such a powerplant arrangement wherein the installed diameter is relatively low and the drag is therefore reduced for efficient use on aircraft systems.

A further object is to increase the propulsive efficiency of the high bypass ratio turbofan for subsonic flight.

Finally it is an object of the invention to provide a method of operating the powerplant.

Briefly stated, the invention provides a cruise fan powerplant arrangement with a pair of spaced tip turbine fans symmetrically arranged adjacent one another. A nacelle support structure that may be supported from a wing or fuselage extends between the fans and is fixedly faired into the periphery of each fan to reduce the exposed peripheral area of the separate fans by not less than 25%. The nacelle structure is provided with plural gas generator means which are adjacent one another and substantially fixed in the nacelle so that a plane through their centers is substantially at right angles to the plane through the centers of the fans. Suitable duct means connect the gas generators and the fans so that each fan receives part of the output of each gas generator. Additionally, the powerplant is operated by a novel method wherein gas generators are deliberately shut down during a mission as the load gets lighter so that operation takes place on the most favorable portion of the specific fuel consumption versus thrust curve of the powerplant.

While the specification concludes with claims particularly pointing out and distinctly claiming the subject matter which is regarded as the invention, it is believed the invention will be better understood from the following description taken in connection with the accompanying drawings in which:

FIG. 1 is a partial front view of a typical aircraft having wing supported powerplants of the instant invention;

FIG. 2 illustrates in partial perspective a conventional multi-gas generator cruise fan powerplant;

FIG. 3 illustrates in partial perspective a powerplant arrangement of the instant invention as it might be applied to a fuselage and using two gas generators;

FIG. 4 is a partial perspective of a powerplant of the instant invention applied to a wing and using three gas generators;

FIG. 5 is a plot of specific fuel consumption versus thrust for the installation in FIG. 3;

FIG. 6 is a similar plot for the installation of FIG. 4;

FIG. 7 is a partial cross-section illustrating a typical tip turbine fan arrangement; and FIGS. 8 and 9 are schematic illustrations of the duct and scroll arrangements for the two and three gas generators modifications respectively.

The invention will be described as applied to an aircraft although it will be apparent that, as a powerplant arrangement, it may be used on other vehicles.

Referring first to FIG. 1, an aircraft generally indicated at 10 is intended to illustrate a large, heavy, long range, subsonic aircraft. Such aircraft may be equipped with conventional jet engines suspended from wing 11 by suitable pylons 12 in a well-known manner. Conversely, the pylon 12 may extend from the fuselage and have the engines supported thereon as in the well-known Caravelle. The powerplant arrangement of the instant invention, generally indicated at 13, is substituted for the conventional engines and will be more specifically described below.

It is desired to take advantage of the variable bypass ratio effect and consequent favorable specific fuel consumption (SFC) versus thrust curve typical of a turbofan engine. A conventional installation is illustrated in FIG.

2 wherein two gas generators 14 may be used with a cruise fan 15, the whole powerplant being suspended by pylon 12. Such an arrangement is satisfactory except that it does not have the versatility, advantages, and favorable long range operating characteristics of the invention. Furthermore, fan 15, for a given thrust, must be relatively large. This results in the powerplant arrangement of FIG. 2 providing a relatively large frontal area and consequent high drag tending to offset the advantages of the powerplant.

In order to realize the above advantages and, at the same time, reduce the drag and permit operation at low SFC over very long ranges under widely varying load conditions, the invention, as shown in FIGS. 1 and 3, provides a pair of spaced tip turbine fans 16 and 17 that are symmetrically arranged adjacent one another. By "symmetrical" it is intended to mean that the two fans are arranged to direct their thrust along parallel lines. In order to tie the fans together, a nacelle or strut support structure 18 may be attached to a fuselage 19 as in FIG. 3. This may, of course, be equivalent to pylon 12 in FIG. 1 and be supported directly from the wing. Since it is desired that both fans 16 and 17 provide propulsion and therefore must be connected together, the nacelle support structure 18 extends between the fans as shown. Any exposed area, either pylon or fan, is a surface or area that will be washed by air and therefore generate friction and it is desired to keep this surface to a minimum. To this end, the nacelle structure 18 is fixedly faired into the periphery of each fan or vice versa as shown in FIG. 1 to reduce the exposed peripheral area of the separate fans. With this arrangement of fans and support, it is possible to reduce the normal exposed separate fan areas by not less than 25% and up to 30% with three gas generators. It can be seen that the surface of each fan that is covered by the nacelle is taken out of the free air stream so that no friction is developed. Since the nacelle is present in this manner for support of the fans it provides a ready holder for gas generators and to this end, plural gas generators 20 are provided in the nacelle. In order to make advantageous use of this nacelle holder the gas generator means, as shown in FIGS. 1 and 3, are disposed adjacent one another and they are fixed in the nacelle. As may best be seen in FIG. 1, the gas generators are so arranged that the plane 21 through the center of the gas generators is disposed at right angles to the plane 22 that passes through the center of the fans. This is true whether a twin gas generator arrangement is used with the fans in a vertical plane and the gas generators in a horizontal plane with respect to the airframe as in FIG. 3 or whether a tri-gas generator arrangement is used with the fans in a horizontal plane and the gas generators in a vertical plane as in FIG. 4 or similar reverse arrangements. In the powerplant arrangements shown in FIGS. 3 and 4, each gas generator 20 preferably uses half of its output to operate the fans 16 and 17, i.e., each gas generator connects with each fan. While this is the general condition and is described as a preferred illustration, it should be appreciated that exactly half of the output of each generator 20 does not have to go to the fans but part of the generator output might be used elsewhere for other purposes. The significant point is that each fan receives the same amount of output from each of the gas generators 20.

Referring next to FIG. 5, the significance of the plural gas generator dual fan arrangement will be described. As previously explained, it is desirable to have a high bypass ratio turbofan but, it is also desirable to have operation over long distances and over widely varying thrust levels. A typical curve of a high bypass ratio turbofan wherein specific fuel consumption is plotted against net thrust is shown in FIG. 5. Such a curve is illustrated by line 23 shown dotted and solid for a purpose to be explained. It will be seen that, at low thrust outputs or low power settings, the specific fuel consumption rises very fast in the dotted portion so that at about 20% of maximum thrust the fuel consumption goes up dramatically. Operation at the flat or bucket portion of the curve in the 80% to 100% thrust category is desired since this is at the lowest specific fuel consumption. It will be appreciated that a very heavily loaded aircraft needs maximum thrust to get into the air at the beginning of its mission. However, over a very long range, as half of the take-off weight of the aircraft is used up by consumption of the fuel, it can also be seen that at the end of the mission a very low power setting calling for low thrust is all that is required to maintain the aircraft cruising speed. Unfortunately, reducing the power setting to provide only 30% thrust increases the fuel consumption by approximately 22% (to 1.22 on line 23) as shown by the curve. These values are all relative and line 23 is merely intended to illustrate a typical curve for a turbofan type engine of the type used in the present invention. Suffice to say that operation at low power settings giving low thrust results in a very large increase in specific fuel consumption.

However, with the present invention using two gas generators or twin gas generators of FIG. 3 and operating both fans an actual plot of the curve is the plot of line 23. Line 24 is a plot for one gas generator. It immediately becomes apparent that, for long range missions and at subsonic speeds up to Mach 7 it is possible to remain in the low portion of the curve of the fuel consumption. This is obtained by operating all gas generators simultaneously along the solid line portion 25 from 100% thrust down to 50% thrust at which selected point, when much of the fuel has burned off and the load is lighter, it is then possible to shut down one of the gas generators 20 and immediately drop down to line 24 where operation may be continued along the solid portion of line 24 down to 25% or 30%. The method of operation by shutting down the gas generator will occur where the thrust from the powerplant or fan is about equal to that required to maintain the speed and altitude of the aircraft. In other words, it takes less power to keep the aircraft going at a selected point and it is here that it is desirable to cut off a generator and drop to line 24. This should be contrasted of course, with operation on a single line, such as line 23, of other types of powerplants. By deliberately shutting down one of the gas generators and dropping to line 24 it will be immediately seen that, at 30% thrust, the SFC is only 1.06 or has increased only 6% over the 100% setting as against a 22% increase (1.22 on the line 23) that would occur by continued operation on line 23. This is indeed a dramatic fuel saving obtainable by the powerplant arrangement of the present invention.

Referring next to FIG. 6, a similar method of operation is found for the three gas generator arrangement of FIG. 4. In FIG. 6, as fuel is used up in the mission to lighten the load, operation is made to occur along the solid portion 26 to always operate at the low SFC portion of the curves. Thus, whereas continued operation on the three gas generator line to 30% thrust (below 30% may not be feasible) would require an SFC increase of 24% (1.24 on the three gas generator line), by shutting down two gas generators it is possible to progressively drop down two lines or curves to an SFC increase of only 5% (1.05 on the one gas generator line). It will immediately be apparent that this is a tremendously significant saving and improvement in the cost of long range subsonic operation.

However, there is an additional important feature to be noted. This dramatic saving in fuel consumption with the unique powerplant arrangement is obtained with no great loss of thrust by deliberately cutting out gas generators. It is known that with plural gas generators feeding tip turbine fans, the loss of a single gas generator does not result in a proportionate loss in thrust. This is discussed in U.S. Patent 3,095,164 assigned to the assignee of the instant invention. For example in the installation of FIG. 3, if one of the two engines 20 is stopped, only 37% of the thrust from the fans 16 and 17 is lost rather than 50%. This is true because of a horsepower-fan-speed relationship that holds for plural gas genermators driving plural tip turbine fans. Thus, only 37% of the thrust is lost by cutting off one of the gas generators in the FIG. 3 modification. At some point in the mission, due to the lightened condition of the aircraft by burning off fuel, less thrust is required to maintain aircraft speed. Assume that this required thrust is 30% of full thrust. This required thrust may be obtained with either one or two gas generators in the FIG. 3 modification. If two are used, it will be seen from the curves in FIG. 5 that the SFC at the 30% condition is 22% (1.22 on the two gas generator curve) greater than full thrust (value of 1.0 on the curve). However, if one gas generator is shut down, the curve shows an increase of only 6% (1.06 on the one gas generator curve). Obviously, this last is the condition that should be selected because it is more economical. Its selection becomes mandatory when it is realized that not only is the SFC cut considerably by shutting down a gas generator or engine but also, with this power plant arrangement, 63% of the total thrust available from two gas generators at any given condition, is available with one engine out. Thus, one benefit complements the other in this powerplant.

A similar remarkable achievement is obtained in the three gas generator-two fan arrangement of FIG. 4. In this arrangement the loss of one gas generator does not result in losing 33% of the power. Only 23% is lost by cutting out one of the gas generators and the thrust from the remaining two gas generators is equal to 77% of the total and not 67% as would be the case with three separate engines in place of the powerplant arrangement shown. As explained above, but now referring to FIG. 6, operation at 30% of full thrust is efficiently carried out with two gas generators shut down which will again result in only about a 6% increase (1.06 on the gas generator curve) in SFC while retaining 49% of the thrust available from three gas generators at any given condition.

The actual point of shutting down the gas generators in either the FIG. 5 or FIG. 6 modifications to drop down a curve and follow the solid line is selected when the thrust required to maintain the vehicle speed, and altitude when in an aircraft, equals the thrust available with one gas generator out in FIG. 5 and, at a later point in the mission, with two gas generators out in FIG. 6. When these thrust equalities are present, one or more gas generators are shut down to insure operation on the flat or low SFC part of the curves with the benefits noted above.

In order to provide further efficiencies in the powerplant arrangement, it is preferable to have the nacelle and its included gas generators extend forward of the fans as shown so that the gas generators receive the full unobstructed effect of ram air.

Referring next to FIG. 7, a cross-sectional view of a typical single tip turbine fan is shown. This includes tip turbine buckets 27 on fan blades 28 supported on a center plug 29 for rotation in the nacelle 30. Suitable scroll means 31 is provided within the nacelle to duct the exhaust gases from the gas generators to the tip turbine to drive the fan 28 and discharge into the exhaust stream.

Referring to FIG. 8, the twin gas generator arrangement of FIG. 3 is diagrammatically shown. In this figure, scroll means 31 from top gas generator 20 may feed half of the periphery of each of fans 16 and 17 as shown. A similar scroll 32 separated from 31 may feed each of the fans 16 and 17 with half of the output of bottom gas generator 20.

FIG. 9 illustrates diagrammatically the scroll means for the three gas generator modification of FIG. 4. In this figure, the top gas generator 20 may, by suitable duct means, extend its effect over 120° of each fan periphery by means of scrolls 33 and 34 so that the top gas generator 20 puts half of its output to each of the fans 16 and 17 as shown. Similarly each of the remaining gas generators provides its output to a third of each fan by a separated peripheral scroll means. It is possible to increase the number of gas generators beyond three but significant additional gains are not obtained since the peripheral area reduction gain becomes negligible so that the practical installations are the two and three gas generator dual fan arrangement as completely described herein.

It will be seen that the marrying or fairing of the nacelle structure and the fan structure reduces the overall peripheral area to cut the drag at least 25% and the nacelle also provides the housing for the gas generators. The unique powerplant arrangement permits operation over a very wide range of thrust or power settings for extremely long range operation at very low specific fuel consumption. This is done by deliberately cutting out the gas generators as the mission progresses and, because of the tip turbine fans-gas generator arrangement, the deliberately cutting off of the engines does not result in proportionate loss of thrust as fully explained above.

While there have been shown preferred formed of the invention, obviously modifications and variations are possible in light of the above teachings. It is therefore to be understood that within the scope of the appended claims, the invention may be practiced otherwise than as specifically described.

I claim:
1. A cruise fan powerplant arrangement comprising,
   a pair of spaced tip turbine fans symmetrically arranged adjacent one another,
   a nacelle support structure between said fans adapted for attachment to an airframe,
   plural gas generator means disposed adjacent one another and fixed in said nacelle with the plane through the center of the gas generators being substantially perpendicular to the plane through the center of said fans,
   said nacelle being fixedly faired into the periphery of each fan to reduce the exposed peripheral area of the separate fans by not less than twenty five percent,
   and duct means connecting the gas generators and fans so that each fan receives part of the output of each gas generator.
2. Apparatus as described in claim 1 wherein said fans are arranged in a horizontal plane and the gas generators in a vertical plane with respect to an airframe.
3. Apparatus as described in claim 1 wherein said fans are arranged in a vertical plane and the gas generators in a horizontal plane with respect to an airframe.
4. Apparatus as described in claim 1 wherein two gas generators are disposed in the nacelle.
5. Apparatus as described in claim 1 wherein each fan is provided with separated scroll means on its periphery and
   each gas generator is connected to a separate scroll means on each fan to provide half its output to each fan.
6. The method of operating the powerplant arrangement of claim 1 on a vehicle mission comprising the steps of,
   operating the plural gas generator means simultaneously at the start of the mission,
   stopping one of the gas generator means at a selected point on the mission substantially when the thrust available from the powerplant minus one gas generator equals that required to maintain speed of the lightened vehicle whereby operation on the specific fuel consumption versus thrust curve of the powerplant occurs on the flat part of the curve at low SFC.
7. The method of claim 6 when the gas generator means includes more than two, of stopping a second gas generator at a selected later point in the mission after stopping the first substantially when the thrust available from the powerplant minus two gas generators equals that required to maintain speed of the further lightened vehicle whereby operation on the specific fuel consumption versus thrust curve of the powerplant occurs on the flat part of the curve at low SFC.

8. The method described in claim 6 wherein the steps of operation are applied to an aircraft and the step of stopping one of the gas generators is taken when the thrust equality is that required to maintain speed and altitude.

9. The method described in claim 7 wherein the steps of operation are applied to an aircraft and the step of stopping the second gas generator is taken when the thrust equality is that required to maintain speed and altitude.

10. A cruise fan powerplant arrangement comprising, a pair of spaced tip turbine fans symmetrically arranged adjacent one another,
a nacelle support structure between said fans adapted for attachment to an airframe,
said nacelle being fixedly faired into the periphery of each fan to reduce the exposed peripheral area of the separate fans by not less than twenty five percent,
two gas generators disposed adjacent one another and fixed in said nacelle with the plane through the center of the gas generators being substantially perpendicular to the plane through the center of said fans,
said nacelle and gas generator inlets therein extending forward of said fans, and
duct means connecting the gas generators and fans so that each fan receives part of the output of each gas generator.

11. A cruise fan powerplant arrangement comprising, a pair of spaced tip turbine fans symmetrically arranged adjacent one another,
a nacelle support structure between said fans adapted for attachment to an airframe,
three gas generators disposed adjacent one another and fixed in said nacelle with the plane through the center of the gas generators being substantially perpendicular to the plane through the center of said fans,
said nacelle being fixedly faired into the periphery of each fan to reduce the exposed peripheral area of the separate fans over twenty five percent,
and duct means connecting the gas generators and fans so that each fan receives part of the output of each gas generator.

12. Apparatus as described in claim 11 wherein each fan is provided with separated scroll means on its periphery, and
each gas generator is connected to a separate scroll means on each fan to provide half its output to each fan.

13. Apparatus as described in claim 11 wherein the nacelle extends forward of said fans and the gas generator inlets are forward of the fans.

References Cited by the Examiner
UNITED STATES PATENTS

| | | | |
|---|---|---|---|
| 1,809,271 | 6/1931 | Goddard | 244—15 X |
| 3,110,456 | 1/1963 | Creasey et al. | 244—12 |
| 3,115,317 | 12/1963 | Merrick | 244—12 |
| 3,117,748 | 1/1964 | Gerlaugh. | |
| 3,139,244 | 6/1964 | Bright | 244—55 X |

OTHER REFERENCES

Aviation Week and Space Technology, May 11, 1964, p. 70 et seq.

MILTON BUCHLER, *Primary Examiner.*

L. C. HALL, *Assistant Examiner.*